F. A. PARKHURST.
COMPOSITE PISTON FOR INTERNAL COMBUSTION MOTORS.
APPLICATION FILED JULY 24, 1916.

1,329,822.

Patented Feb. 3, 1920.
3 SHEETS—SHEET 1.

Inventor:
Frederick A. Parkhurst
by Edward P. Alexander
his Attorney

F. A. PARKHURST.
COMPOSITE PISTON FOR INTERNAL COMBUSTION MOTORS.
APPLICATION FILED JULY 24, 1916.

1,329,822.

Patented Feb. 3, 1920.
3 SHEETS—SHEET 2.

Inventor
Frederick A. Parkhurst,
by
Edward P. Alexander
his Attorney

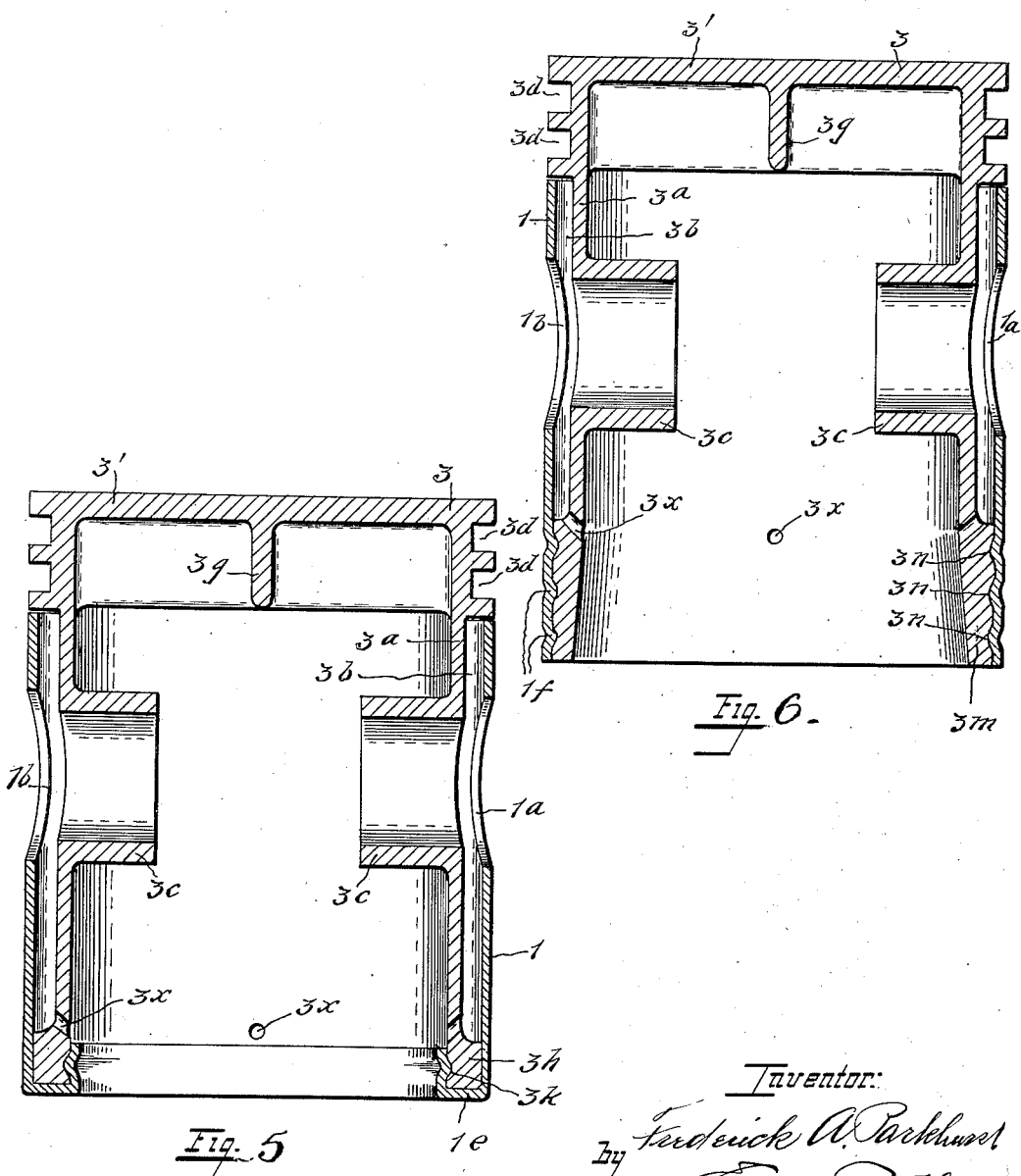

UNITED STATES PATENT OFFICE.

FREDERIC A. PARKHURST, OF CLEVELAND, OHIO, ASSIGNOR TO THE ALUMINUM CASTINGS COMPANY, OF CLEVELAND, OHIO, A CORPORATION OF OHIO.

COMPOSITE PISTON FOR INTERNAL-COMBUSTION MOTORS.

1,329,822. Specification of Letters Patent. Patented Feb. 3, 1920.

Application filed July 24, 1916. Serial No. 110,844.

*To all whom it may concern:*

Be it known that I, FREDERIC A. PARKHURST, a citizen of the United States, residing at Cleveland, in the county of Cuyahoga and State of Ohio, have invented certain new and useful Improvements in and Relating to Composite Pistons for Internal-Combustion Motors, of which the following is a specification.

This invention relates to pistons for use particularly in internal combustion motors.

One of the objects of my invention is to produce a simple, light, durable and efficient skirted, composite piston peculiarly adapted to meet the conditions which exist within an internal combustion motor cylinder, including the stresses and strains imposed upon the piston, principally during the explosion stroke and by the high heat generated at this time, which heat must be efficiently and economically (a) utilized in the translation of heat into mechanical energy and (b) that not translated into mechanical energy properly dissipated.

My present invention comprises improvements on the invention of Joseph H. Bamberg disclosed in his Letters Patent of the United States No. 1,296,589. It contemplates providing a relatively light, durable composite piston, utilizing the principal advantageous characteristics of the piston invented by Mr. Bamberg and employing a guiding section of material of greater resistivity to wear than the metallic alloys of aluminum now commercially used in piston construction, some of which are referred to in Mr. Bamberg's said patent.

Purely for the purposes of disclosure herein I have selected to illustrate and describe one construction of internal combustion motor, skirted piston and several modifications thereof embodying my improvements.

Figure 1:
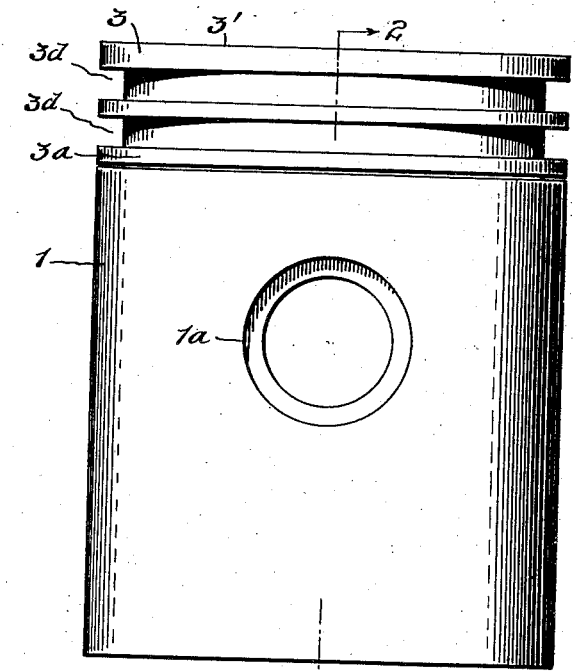

In the drawings, Figure 1 is a side elevation of a piston embodying my improvements.

Figure 2:
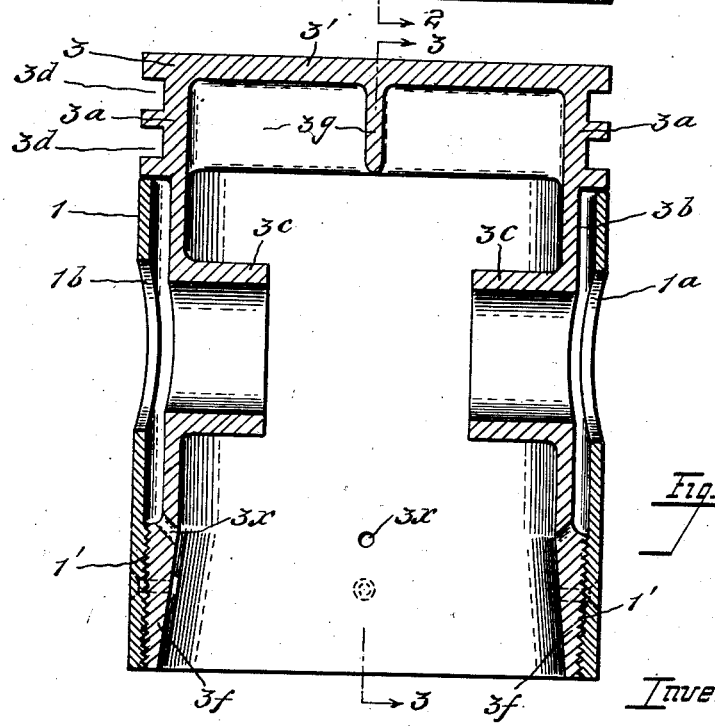
Figure 3:
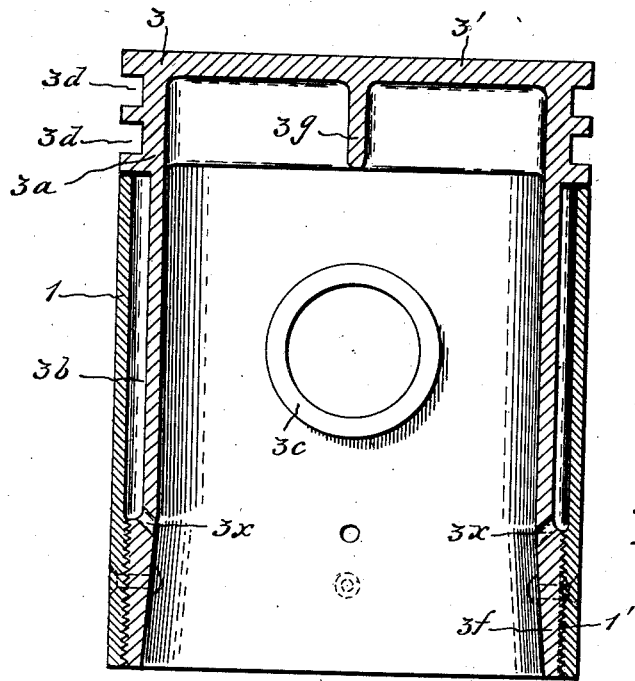
Figure 4:
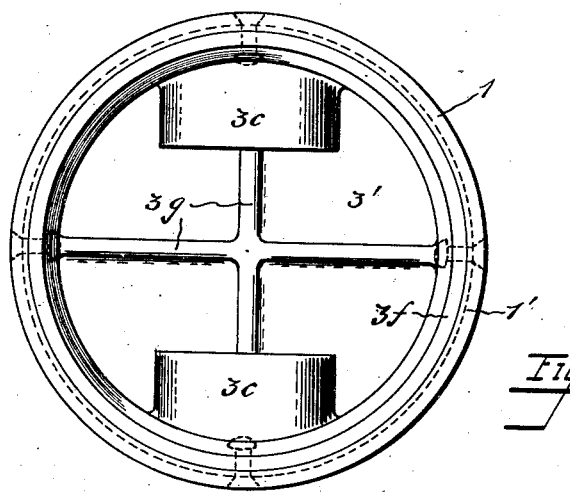

Fig. 2 is a section on the line 2—2, Fig. 1.
Fig. 3 is a section on the line 3—3, Fig. 2.
Fig. 4 is a botttom plan view.
Figs. 5 and 6 illustrate modified constructions for securing together the elements of which the piston is constructed.

1 is the skirt, body or guide portion of the piston, which may be made of any material suitable to resist wear in operation within an internal combustion motor cylinder, such as a section of steel tubing, a steel stamping, or an iron casting, having diametrically opposed apertures through it, $1^a$, $1^b$, concentric with the axis of the wrist pin bosses, to permit the insertion and withdrawal of the wrist pin, in the well known manner, as desired.

3 indicates a combined piston head and connecting piece having an end wall $3'$ and downwardly extending side walls $3^a$. The side walls may be suitably recessed intermediate their ends as indicated at $3^b$ and may carry diametrically opposed annular wrist pin bosses $3^c$. The periphery of the side walls adjacent the end wall $3'$ may be suitably recessed as indicated at $3^d$ to receive piston rings of any well known construction.

The section $3^f$ at the lower end of this combined head and connector may be secured to the lower end of the skirt 1 in any suitable manner. Preferably I make the connection by forming a circumferentially extending groove on one of said parts and a complementary ridge on the other part which snugly fits the groove; or a plurality of such ridges and grooves can be provided. In Figs. 2, 3 and 4 I have shown a connection of this character effected by externally screw-threading the section $3^f$ and internally screw-threading an annular boss $1'$ at the lower end of the sleeve 1. When this connection is made, if desired the sleeve 1 may be heated so as to expand its section $1'$, and the screw threaded portions of the parts 1 and 3 may be screwed together while the part 1 is thus heated so as to obtain a shrink fit on this threaded connection.

The part 3 may be made of any desired material having a relatively low specific gravity and may be formed in any suitable manner. I prefer to make it of an aluminum alloy cast in a permanent mold and suitably poured and chilled so that its structure will be relatively fine-grained and non-porous and the eutectic will substantially surround the excess substance in the structure. For example, this combined head and connector 3 may be made in accordance with the invention of Joseph Bamberg as set forth and described in his said Letters Patent of the United States No. 1,296,589. Where so constructed suitable strengthening webs or ribs $3^g$ may be provided at the head end of the piston, in the now well known manner.

Another simple manner of connecting the lower end of the element 3 to the lower end of the skirt 1 by ridge and groove is illustrated in Fig. 5, wherein the enlarged lower end $3^h$ of the element 3 has an internal groove $3^k$. The lower end of the skirt 1 is provided with a U-shaped section $1^e$ adapted to receive the lower end of the element 3. When these parts are positioned one within the other, they are spun in a suitable machine for the purpose and a portion of the inner wall of the U-shaped section $1^e$ is spun into the adjacent groove $3^k$ in the inner wall of the section 3, thereby forming a simple, durable and positive connection between the parts.

In Fig. 6 I have shown still another simple, cheap and efficient ridge and groove method of connecting the lower end of the skirt 1 to the lower end of the element 3. In this embodiment of my invention the lower end of the element 3 has preferably an annular enlargement $3^m$ provided on its outer surface with one or more recesses $3^n$. The inner wall of the lower end of the sleeve 1 snugly engages the outer wall of the enlargement $3^m$. The parts are placed in a suitable spinning machine and sections $1^f$ of the skirt 1 are spun in the well known manner into the adjacent recess or recesses $3^n$ in the section $3^m$ of the element 3, thereby effecting a durable, simple, efficient and positive connection of these parts.

A plurality of holes $3^x$ are provided through the side walls $3^a$, preferably adjoining the points at which their lower ends are secured to the skirt 1. These holes or ducts provide oil escapes or drain passages for lubricant or oil which may collect between the skirt 1 and the lower end of the combined piston head and connecting element 3.

It will be understood that the sleeve or skirt 1 may be constructed so as snugly to fit the inner walls of the motor cylinder, whereas the portion of the head 3 above it may be given a considerable amount of clearance between its outer surface and the inner wall of the cylinder to allow for all necessary expansion of the head due to the high temperatures to which it is subjected. The heat absorbed by the head is transferred downwardly by the side walls $3^a$ to the lower end of the skirt 1, and much of it is dissipated by radiation, so that the skirt is kept relatively cool and may be readily lubricated to provide and maintain the proper working relationship between it and the inner wall of the motor cylinder with which it co-acts. The fit between the skirt and the inner wall of the cylinder, as before indicated, may be a snug sliding fit, and preferably the area of the skirt which co-acts with the inner wall of the motor cylinder is such as to insure against slapping or rapping of the piston against the inner wall of the cylinder. In fact, objectionable so-called piston slap, incident to the operation of numerous types of pistons for use in internal combustion motors, substantially is eliminated by the use of a piston constructed in accordance with my invention as shown in the drawings. Furthermore, a piston embodying my improvements herein described practically eliminates so-called "oil pumping" or transfer of an undue amount of oil or lubricant from the crank case to the upper end of the piston, resulting in undesirable smoking and undue and troublesome carbonization, among other things.

The upper end of the skirt 1 is separated from the head 3 by an air gap. In the drawings, purely for the purpose of illustration, this air gap is shown relatively wide. The presence of this air gap or air space between the upper edge of the skirt or body section 1 and the adjacent edge of the piston head, insures that the heat absorbed by the piston head principally will be transmitted inwardly and downwardly so that such portion of it as does reach the skirt or body by conduction will do so near the lower end of the skirt and will not be sufficient in amount to cause the necessary expansion of the skirt to effect binding between the skirt and inner wall of the cylinder or scoring. While this air gap, as above stated, has been shown relatively wide for the purpose of illustration, it will be understood that my invention contemplates any sort of a separated relationship between the upper end of the skirt and the adjacent head 3 because of which heat will not be transmitted efficiently or readily from said head to the skirt. It will be understood that this relationship might be that even of a poor mechanical fit or joint which would be a poor conductor of heat as compared with the metal of the side walls $3^a$ so that such heat as did pass from the head to the guide section 1 would do so principally by way of the side walls $3^a$, rather than from the head to the upper end of the skirt 1.

To insure that the skirt or guide section 1 of the constructions illustrated in Figs. 1 to 4, inclusive, and 5 and 6 will be locked against angular movement relative to the combined piston head and connecting piece 3 in ordinary operation, a rivet screw or stud or a plurality of the same may be used between these parts as indicated in dotted lines in Figs. 2, 3 and 4.

It is obvious that a piston made in accordance with my invention can be made relatively light in weight so as to largely reduce the weight of the reciprocating parts of the engine; and at the same time, as has been pointed out, my improved construction eliminates piston slap, oil pumping and scoring of the engine cylinder. It is to be observed that these advantages flow from the composite structure of my improved piston and especially from a suitable choice of materials for the head and guide parts, respectively; the aluminum head insures light weight, while the wear-resisting guide section, especially if it be made of iron, provides suitable wearing qualities and, by reason of its relatively low coefficient of thermal expansion, makes possible the snug fit of the piston in the engine cylinder, this latter result being furthered in a measure by the poor heat conductivity of the joint between the head and guide sections of the piston.

Certain features herein disclosed, especially in Fig. 6 of the drawing, constitute the subject-matter of claims in my copending application Serial (renewal) No. 259,596, filed July 24, 1916.

To those skilled in the art, many modifications of and widely differing embodiments and applications of my invention will suggest themselves, without departing from the spirit and scope thereof. My disclosures and the descriptions herein are purely illustrative and are not intended to be in any sense limiting.

What I claim is:

1. A composite piston for an internal combustion motor comprising a head, wrist pin bosses and a connector extending below said bosses cast integrally of a metallic alloy having a relatively low specific gravity in comparison with iron, and a guide section of wear-resisting material surrounding said bosses and connector extension therebelow and having its upper end separated from the adjacent wall of the head by an air gap, the lower ends of the guide section and the said extension being secured together by a circumferentially extending groove on one of them and a complementary ridge on the other which fits the said groove.

2. A composite piston for an internal combustion motor comprising a head, wrist pin bosses and a connector extending below said bosses cast integrally of a metallic alloy having a relatively low specific gravity in comparison with iron, and a guide section of wear-resisting material surrounding said bosses and connector extension therebelow and having its upper end separated from the adjacent wall of the head by an air gap and its lower end internally screw threaded and fitted to the lower end of said extension which is correspondingly externally screw threaded.

3. A composite piston for an internal combustion motor comprising a head, wrist pin bosses and a connector extending below said bosses cast integrally of a metallic alloy having a relatively low specific gravity in comparison with iron, and a guide section of wear-resisting material surrounding said bosses and connector extension therebelow and having its upper end separated from the adjacent wall of the head by an air gap and its lower end internally screw threaded and fitted with a shrink fit to the lower end of said extension which is correspondingly externally screw threaded.

In testimony whereof I affix my signature.

FREDERIC A. PARKHURST.